United States Patent
Minegishi

(10) Patent No.: US 10,310,839 B2
(45) Date of Patent: Jun. 4, 2019

(54) INFORMATION PROCESSING APPARATUS, CONTROL PROGRAM MANAGEMENT SYSTEM, AND CONTROL PROGRAM MANAGEMENT METHOD

(71) Applicant: Youichi Minegishi, Kanagawa (JP)

(72) Inventor: Youichi Minegishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 276 days.

(21) Appl. No.: 15/363,790

(22) Filed: Nov. 29, 2016

(65) Prior Publication Data

US 2017/0153884 A1 Jun. 1, 2017

(30) Foreign Application Priority Data

Nov. 30, 2015 (JP) .................................. 2015-233804
Oct. 5, 2016 (JP) .................................. 2016-197514

(51) Int. Cl.
| | |
|---|---|
| *G06F 9/44* | (2018.01) |
| *G06F 8/65* | (2018.01) |
| *G06F 3/12* | (2006.01) |
| *G06F 8/61* | (2018.01) |
| G06F 9/4401 | (2018.01) |

(52) U.S. Cl.
CPC .............. *G06F 8/65* (2013.01); *G06F 3/1225* (2013.01); *G06F 3/1229* (2013.01); *G06F 8/61* (2013.01); *G06F 9/4411* (2013.01)

(58) Field of Classification Search
CPC .......... G06F 8/65; G06F 21/53; G06F 9/4411; G06F 11/0733; G06F 3/1225; G06F 3/1229; G06F 8/61; H04L 41/082
See application file for complete search history.

(56) References Cited

U.S. PATENT DOCUMENTS

| | | | | |
|---|---|---|---|---|
| 6,633,899 B1* | 10/2003 | Coward | .................... | G06F 8/65 |
| | | | | 709/202 |
| 2003/0115302 A1* | 6/2003 | Teraoaka | ............ | G06F 11/0733 |
| | | | | 709/221 |
| 2004/0030809 A1* | 2/2004 | Lozano | ................. | G06F 9/4411 |
| | | | | 710/8 |
| 2009/0038002 A1 | 2/2009 | Minegishi | | |
| 2009/0217161 A1 | 8/2009 | Minegishi | | |

(Continued)

FOREIGN PATENT DOCUMENTS

| | | |
|---|---|---|
| JP | 2007-080280 | 3/2007 |
| JP | 2010-182116 | 8/2010 |

*Primary Examiner* — Tuan A Vu
(74) *Attorney, Agent, or Firm* — Duft & Bornsen, PC

(57) ABSTRACT

An information processing apparatus includes circuitry that detects execution of an installation program that installs a control program onto the information processing apparatus, the control program controlling hardware connected to the information processing apparatus, specifies a location where identification information identifying the control program is stored in response to detection of the execution, acquires the identification information from the specified location, determines whether or not a newer version of the control program exists compared to a version of the control program identified with the acquired identification information, and performs an operation in accordance with a determination result indicating whether or not the newer version of the control program exists.

6 Claims, 11 Drawing Sheets

(56) References Cited

U.S. PATENT DOCUMENTS

| | | | |
|---|---|---|---|
| 2010/0079782 A1* | 4/2010 | Tsuya | G06F 9/4411 358/1.13 |
| 2011/0283275 A1 | 11/2011 | Dan | |
| 2013/0067563 A1* | 3/2013 | Park | G06F 21/53 726/17 |
| 2016/0274825 A1 | 9/2016 | Minegishi | |
| 2016/0274846 A1 | 9/2016 | Minegishi | |

* cited by examiner

| CONNECTION MODE | PnP NAME | WHETHER OR NOT DISTRIBUTION SERVICE IS SUPPORTED | VERSION INFORMATION | LAST UPDATE DATE/TIME |
|---|---|---|---|---|
| Network | PRINTER A | YES | 1.6.0.0 | 2015/07/26 10:43:25 |
| USB | PRINTER B | NO | – | 2015/07/20 20:11:1– |
| ... | | | ⋮ | ⋮ |

FIG. 12
| SUPPORTING INSTALLER | PROCESS NAME | |
|---|---|---|
| RICOH Installer V2 | restup2 | ... |
| RICOH Installer V1 | restup1 | ... |
| ... | | |
FIG. 13
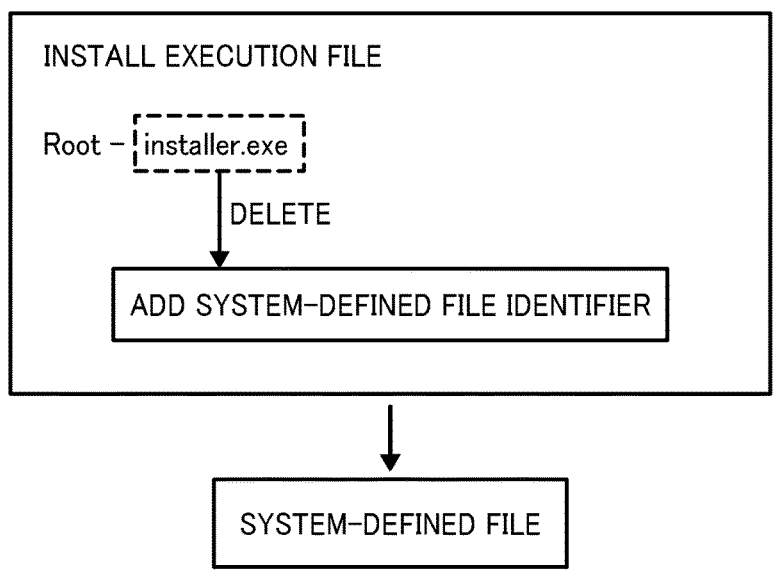
FIG. 14
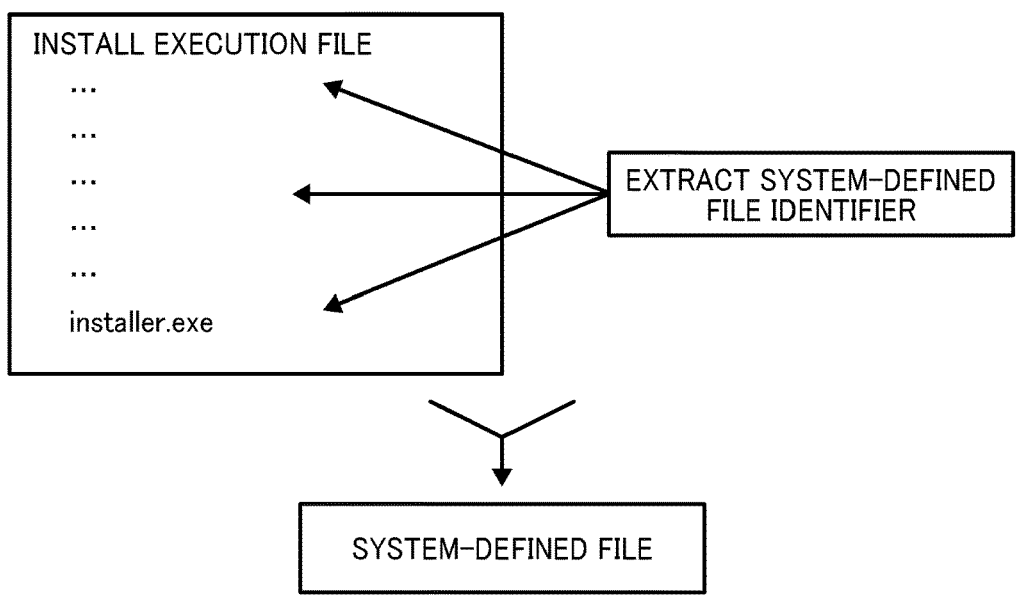

INFORMATION PROCESSING APPARATUS, CONTROL PROGRAM MANAGEMENT SYSTEM, AND CONTROL PROGRAM MANAGEMENT METHOD

CROSS-REFERENCE TO RELATED APPLICATION

This patent application is based on and claims priority pursuant to 35 U.S.C. § 119(a) to Japanese Patent Applications No. 2015-233804, filed on Nov. 30, 2015 and No. 2016-197514, filed on Oct. 5, 2016 in the Japan Patent Office, the entire disclosure of which is hereby incorporated by reference herein.

BACKGROUND

Technical Field

The present invention relates to an information processing apparatus, a control program management system, and a control program management method.

Background Art

With increased computerization of information, image processing apparatuses such as printers and facsimiles used for outputting the computerized information and scanners used for computerizing documents have become indispensable. In most cases, these image processing apparatuses are configured as multifunction peripherals (MFPs) that can be used as a printer, facsimile, scanner, and copier by implementing an image capturing capability, image forming capability, and communication capability, etc.

In known technologies, in case of operating printers used for outputting computerized documents, it is general to generate a print job by using printer drivers installed on information processing apparatuses such as personal computers (PCs) and transfer the generated print job to the printer.

SUMMARY

Example embodiments of the present invention provide a novel information processing apparatus that includes circuitry that detects execution of an installation program that installs a control program onto the information processing apparatus, the control program controlling hardware connected to the information processing apparatus, specifies a location where identification information identifying the control program is stored in response to detection of the execution, acquires the identification information from the specified location, determines whether or not a newer version of the control program exists compared to a version of the control program identified with the acquired identification information, and performs an operation in accordance with a determination result indicating whether or not the newer version of the control program exists.

Further example embodiments of the present invention provide an information processing apparatus and an information processing method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 12 is an illustration of an installer table as an embodiment of the present invention;

FIG. 13 is a diagram illustrating an operation of specifying a system definition file of the driver as an embodiment of the present invention;

FIG. 14 is a diagram illustrating an operation of specifying a system definition file of the driver as an embodiment of the present invention;

Figure 1:
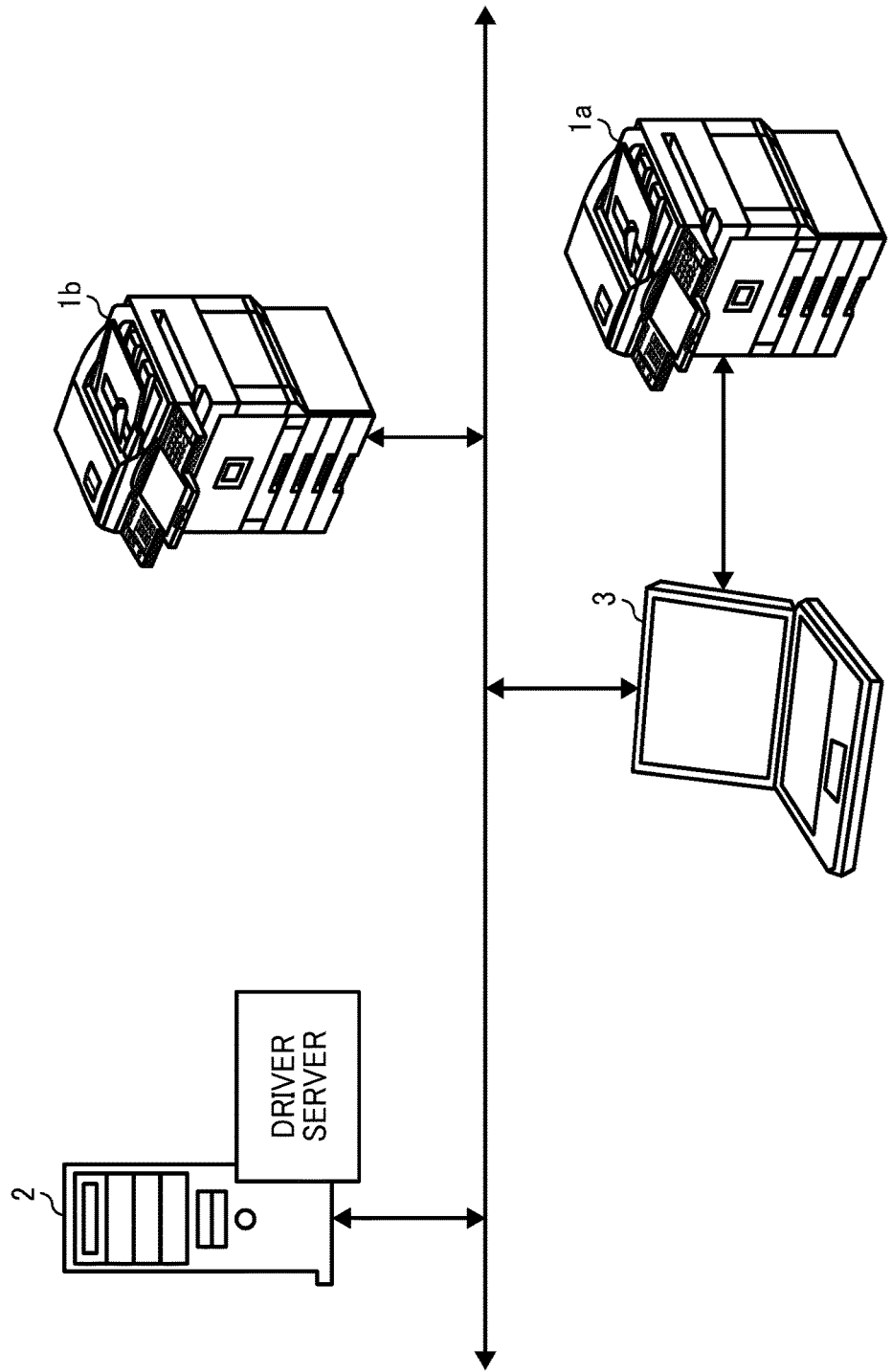
FIG. 1 is a diagram illustrating an image processing system according to an embodiment.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

A system that includes multiple image processing apparatuses and PCs connected with each other via a network is described below as an example of an image processing system in this embodiment. It should be noted that a multifunction peripheral (MFP) including an image scanner is described below as the image processing apparatus in this embodiment.

FIG. 1 is a diagram illustrating an image processing system in this embodiment. As illustrated in FIG. 1, the image processing system in this embodiment includes image processing apparatuses 1a and 1b each of which includes an input/output function such as a printer and a scanner, a driver server 2 that stores printer drivers to be installed for use by the image processing apparatuses 1a and 1b, and a PC 3 as an information processing apparatus to be operated by a user. The driver server 2 stores the printer driver as a print control program that commands the image processing apparatuses 1a and 1b to form and output an image via the PC 3. In addition, as illustrated in FIG. 1, the image processing apparatuses 1a and 1b are communicably connected with the driver server 2 and the PC 3 via the network or a Universal Serial Bus (USB). The system functions as a control program management system that installs the driver for the image processing apparatuses 1a and 1b on the PC 3 from the driver server 2.

The image processing apparatuses 1a and 1b are each implemented as a MFP with an image capturing capability, image forming capability, and communication capability, which can be used as a printer, facsimile, scanner, or copier. In one example, based on image information included in a print job transferred by the PC 3, the image processing apparatuses 1a and 1b each function as a color printer or a monochrome printer that generates drawing information in CMYK or monochrome and forms and outputs an image based on the generated drawing information. In the example illustrated in FIG. 1, the image processing apparatus 1a is a different model from the image processing apparatus 1b. In the below description, however, if it is unnecessary to distinguish between the image processing apparatuses 1a and 1b, the image processing apparatuses 1a and 1b are collectively referred to as the image processing apparatus 1.

The driver server 2 distributes the printer driver as software program that controls the image processing apparatus 1, to the information processing apparatus 1 such as the PC etc. In the driver server 2 in this embodiment, a service program for distributing the printer driver is implemented. The service program is described later.

The PC 3 is the information processing apparatus operated by user operation. The information processing apparatus may be implemented by a mobile information device such as a smartphone or a tablet device etc. in alternative to the PC. The printer driver for controlling the image processing apparatus 1 is installed on the PC 3. In addition, the PC 3 may generate and transfer the print job for commanding the image processing apparatus supported by the printer driver installed in the PC 3 by user operation.

Figure 2:
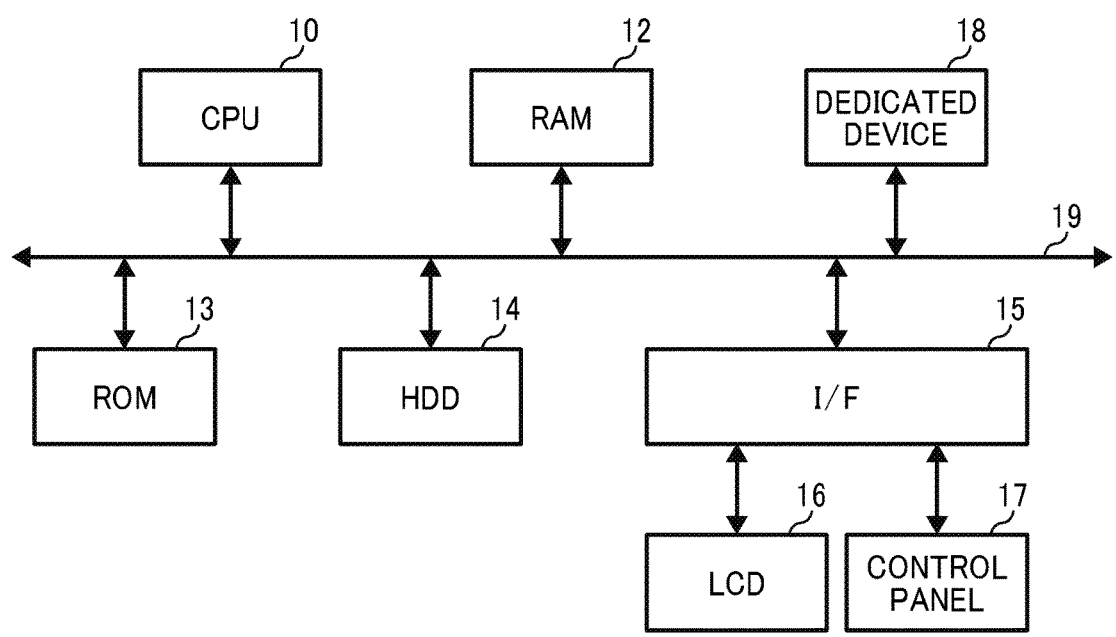
FIG. 2 is a block diagram illustrating a hardware configuration of an image processing system as an embodiment of the present invention.

Next, an entire functional configuration of the image processing apparatus 1 in this embodiment is described below. FIG. 2 is a block diagram illustrating a hardware configuration of the image processing apparatus 1 in this embodiment. In the below description, a hardware configuration of the image processing apparatus 1 is described as an example. However, much the same is true on the case of the driver server 2 and the PC 3.

As illustrated in FIG. 2, the image processing apparatus 1 in this embodiment includes the same configuration as an information processing apparatus such as a general PC and a server etc. That is, in the image processing apparatus 1 in this embodiment, a central processing unit (CPU) 11, a random access memory (RAM) 12, a read only memory (ROM) 13, a hard disk driver 14, and interface (I/F) 15 are connected with each other via a bus 19. In addition, a Liquid Crystal Display (LCD) 16, a control panel 17, and a dedicated device 18 are connected to the I/F 50. It should be noted that user interfaces such as the LCD 16 and the control panel 17 etc. may be omitted in the configuration of the driver server 2. It should be noted that the image processing apparatus 1 includes an engine to implement a scanner and printer etc. in addition to the hardware configuration illustrated in FIG. 2.

The CPU 11 is a processor and controls the whole operation of the image processing apparatus 1. The RAM 12 is a volatile memory that can read/write information at high speed and is used as a work area when the CPU 11 processes information. The ROM 13 is a read-only non-volatile storage medium and stores programs such as firmware. The HDD 14 is a non-volatile storage medium that can read/write information and stores the operating system (OS), various control programs, and application programs etc.

The I/F 15 connects the bus 19 with various hardware and network etc. and controls them. The LCD 16 is a visual user interface to check status of the image processing apparatus 1. The control panel 17 is a user interface for inputting information into the image processing apparatus 1 by user operation. In this embodiment, the control panel 17 includes a touch panel and a hardware key etc.

The dedicated device 18 is hardware for implementing functions specific to the image processing apparatus 1 such as a print engine that forms an image on paper and a scan unit that scans an image on paper.

In this hardware configuration described above, the CPU 11 operates according to programs stored in storage devices such as the ROM 13, HDD 14, and optical discs, which are read to the RAM 12.

Figure 3:
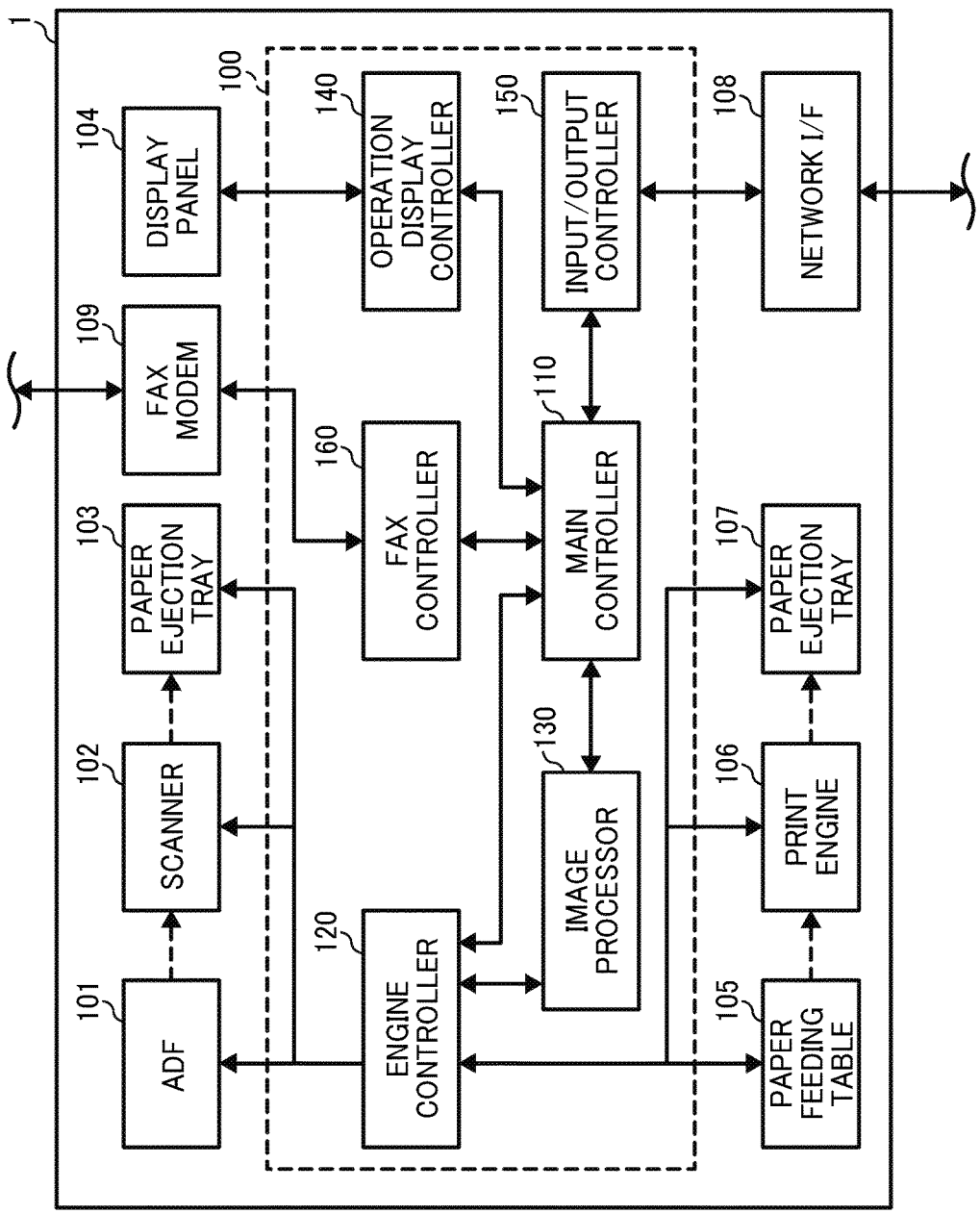
FIG. 3 is a block diagram illustrating a functional configuration of the image processing apparatus as an embodiment of the present invention.
Figure 4:
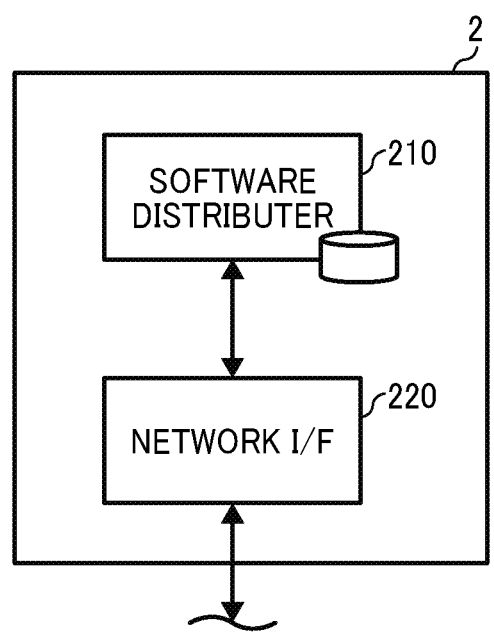
FIG. 4 is a block diagram illustrating a functional configuration of a driver server as an embodiment of the present invention.

Next, a functional configuration of the image processing apparatus 1 in this embodiment is described below with reference to FIG. 3. As illustrated in FIG. 4, the image processing apparatus 1 in this embodiment includes a controller (control circuit) 100, an Auto Document Feeder (ADF) 101, a scanner 102, a paper ejection tray (paper output tray) 103, a display panel 104, a paper feeding table (paper feed table) 105, a print engine 106, a paper ejection tray 107, and a network I/F 108.

In addition, the controller 100 includes a main controller (control circuit) 110, an engine controller (control circuit) 120, an image processor 130, an operation display controller (control circuit) 140, and an input/output controller (control circuit) 150. As illustrated in FIG. 3, the image forming apparatus 1 in this embodiment is constructed as the MFP that includes the scanner 102 and the print engine 106. In FIG. 3, solid arrows indicate electrical connections, and dashed arrows indicate flow of paper or a bundle of documents.

The display panel 104 is both an output interface that visually displays status of the image processing apparatus 1 and an input interface (operational unit) for allowing a user to directly operate the image processing apparatus 1 or input information to the image processing apparatus 1. The display panel 104 is implemented by the LCD 16 and the control panel 17 in FIG. 2.

The network I/F 108 is an interface that the image processing apparatus 1 communicates with other apparatuses via a network, and Ethernet and USB interface are used for the network I/F 108. The network I/F 108 is implemented by the I/F 15 in FIG. 2. In addition, the network I/F 108 also functions as a facsimile modem and functions as an interface that the image processing apparatus 1 transfers and receives facsimile via a network.

The controller 100 is implemented by an integrated circuit, which may perform calculation according to a program stored in the ROM 13, the nonvolatile memory, the HDD 14, or a non-volatile storage medium such as an optical disc etc., which may be loaded in a volatile memory (hereinafter referred to as a memory) such as the RAM 12 etc. The controller 100 functions as a controller that controls the entire image processing apparatus 1.

The main controller 110 controls each unit included in the controller 100 and commands each unit in the controller 100. The main controller 110 in this embodiment performs various operations in accordance with information input to the controller 100. The example operations performed by the main controller 110 are described below. The engine controller 120 controls and drives the print engine 106 and the scanner 102.

The image processor 130 generates drawing information based on image information to be printed under control of the main controller 110. The drawing information is information, used by the print engine 106 as an image forming unit to form an image in image forming operation. The image processor 130 processes scanned image data input from the scanner 102 to generate image data. The generated image data is stored in a storage area in the image forming apparatus 1 as a result of the scanning operation or transferred to another apparatus such as the PC 3 etc. via the network I/F 108.

The operation display controller 140 displays information on the display panel 104 and reports information input via the display panel 104 to the main controller 110. The input/output controller 150 inputs signals and commands input via the network I/F 108 to the main controller 110. In addition, the main controller 110 controls the input/output controller 150 and accesses other apparatuses such as the driver server 2 and the PC 3 etc. via the network I/F 108 and the network.

If the image processing apparatus 1 functions as the printer, first, the input/output controller 150 receives a print job via the network I/F 108. The input/output controller 150 transfers the received print job to the main controller 110. After receiving the print job, the main controller 110 generates the drawing information based on the document information and image information included in the print job by controlling the image processor 130.

After the image processor 130 generates the drawing information, the engine controller 120 commands and controls the print engine 106 to execute forming an image on paper carried from the paper feed table 105 based on the generated drawing information. As particular examples of the print engine 106, any image forming method such as an inkjet method or an electrophotography method can be used. After the print engine 106 forms the image on the paper, the paper is ejected on the paper output tray 107.

If the image processing apparatus 1 functions as a scanner, in response to a command to execute scanning input by operation on the display panel 104 or from an external apparatus via the network I/F 108, the operational display controller 140 or the input/output controller 150 transfers a signal to execute scanning to the main controller 110. The main controller 110 controls the engine controller 120 based on the received signal to execute scanning.

The engine controller 120 drives the ADF 101 and carries a document to be scanned set on the ADF 101 to the scanner unit 102. In addition, the engine controller 120 drives the scanner 102 and scans the document carried from the ADF 101. If the document is not mounted on the ADF 101 and the document is directly set to the scanner 102, the scanner 102 scans the document under control of the engine controller 120. That is, the scanner 102 functions as the image capturing unit.

In scanning operation, an image capturing device such as CCD included in the scanner 102 scans the document optically, and image capturing information is generated based on the optical information. The engine controller 120 transfers the image capturing information generated by the scanner 102 to the image processor 130. The image processor 130 generates the image information based on the image capturing information received from the engine controller 120 under control of the main controller 110. The image information generated by the image processor 130 is stored in the storage device such as the HDD 14 etc. attached to (or provided in) the image processing apparatus 1. That is, the scanner 102, the engine controller 120, and the image processor 130 function as a document scanning unit in cooperation with each other.

The image information generated by the image processor 130 is either stored in the HDD 14 etc. as is or transferred to an external apparatus such as the PC 3 etc. via the input/output controller 150 and the network I/F 108 depending on the user command. As described before, in the image processing apparatus 1 that does not include the function of transferring the scanned image, the image information generated by the image processor 130 is stored in a predetermined memory, and a running driver installed in the information processing terminal such as the PC 3 etc. downloads the image information via the network I/F 108.

If the image processing apparatus 1 functions as a copier, the image processor 130 generates the drawing information based on either the image capturing information received from the scanner 102 by the engine controller 120 or the image information generated by the image processor 130. Similarly as the printer operation, the engine controller 120 drives the print engine 106 based on the drawing information. If information formats are the same between the drawing information and the capture information, the capture information may also be used as the drawing information as is.

Next, a functional configuration of the driver server 2 in this embodiment is described below with reference to FIG. 4. FIG. 4 is a block diagram illustrating a functional configuration of the driver server 2 in this embodiment. As illustrated in FIG. 4, the driver server 2 in this embodiment includes a software distributor 210 and a network I/F 220.

The software distributor 210 distributes software programs such as the driver for the image processing apparatus 1 etc. stored in the driver server 2 to the image processing apparatus such as the PC 3 etc. via the network (hereinafter referred to as "distribution service"). In addition, the software distributor 210 acquires device information of the image processing apparatus 1 and the PC 3 via the network I/F 220 and transfers a software program to the PC 3 based on the device information. The software distributor 210 also stores information on the driver stored in the driver server 2 such as version information etc. for example. As a result, the software distributor 210 functions as a program memory.

Figure 5:
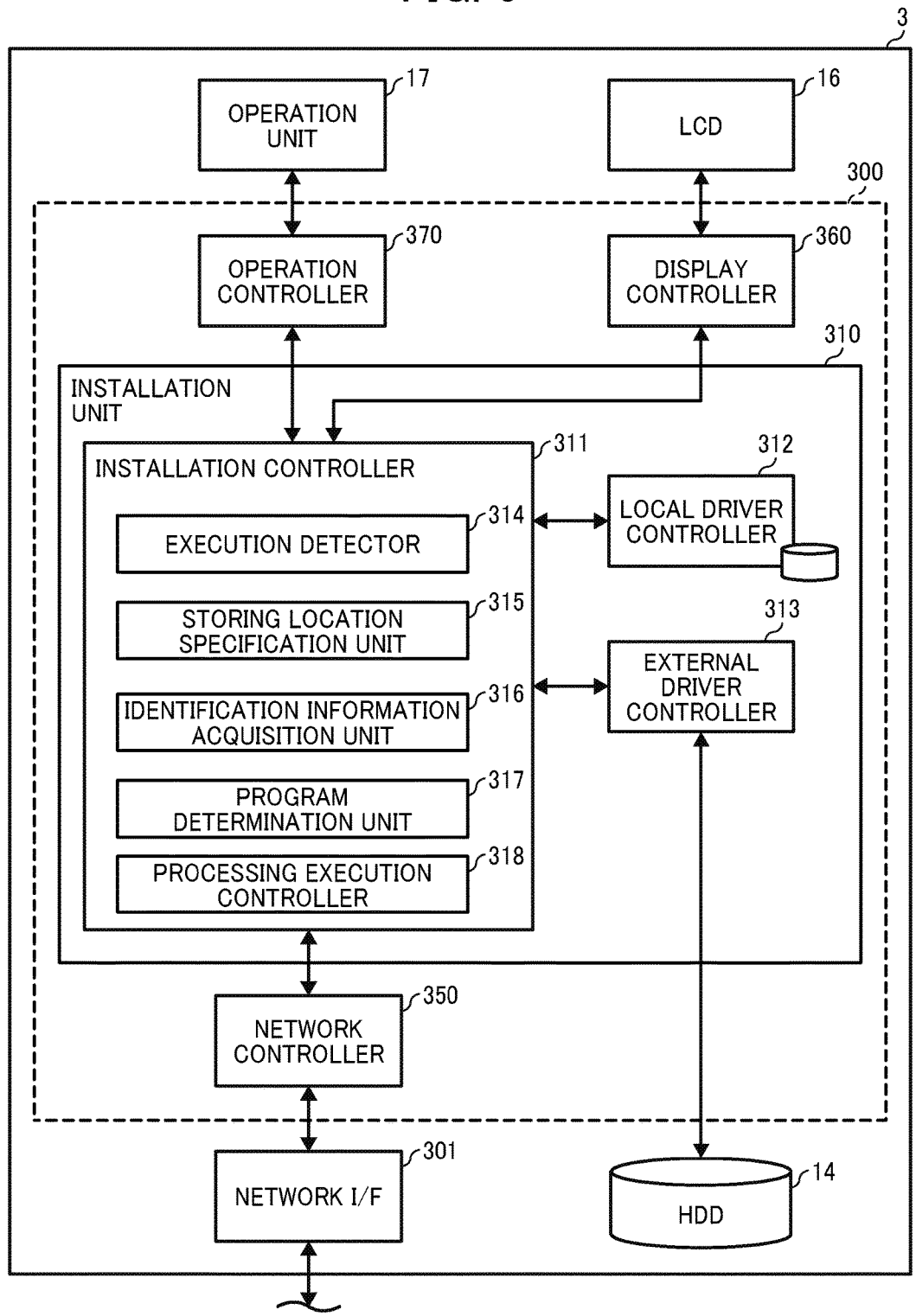
FIG. 5 is a block diagram illustrating a functional configuration of a PC as an embodiment of the present invention.

Next, a functional configuration of the PC 3 in this embodiment is described below with reference to FIG. 5. FIG. 5 is a block diagram illustrating a functional configuration of the PC 3. As illustrated in FIG. 5, in addition to the HDD 14, the LCD 16 and the control panel 17 illustrated in FIG. 2, the PC 3 in this embodiment includes a controller (control circuit) 300 and a network I/F 301. In addition, the controller 300 includes an installation unit 310, a network controller (control circuit) 350, a display controller (control circuit) 360, and an operation controller (control circuit) 370.

The network I/F 301 is an interface that allows the PC 3 to communicate with other apparatuses via a network, which may be implemented by an Ethernet interface or USB I/F. The network I/F 301 corresponds to the I/F 15 in FIG. 2.

The controller 300 is an integrated circuit, which operates according to a program stored in the ROM 13, the nonvolatile memory, the HDD 14, or a non-volatile storage medium such as an optical disc etc., which may be loaded in a volatile memory (hereinafter referred to as a memory) such as the RAM 12 etc. The controller 300 functions as a controller that controls entire PC 3.

The network controller 350 acquires information input via the network I/F 301 and transfers information to another apparatus via the network I/F 301. The display controller 360 displays a status of the PC 3 such as a GUI of the installation unit 310 etc. on a display unit of the LCD 16. The operation controller 370 acquires a signal generated in response to user operation on the control panel 17, and inputs the acquired signal to the installation unit 310 etc. on the PC 3.

In the image processing system described above, in case of transferring a print job from the PC 3 to the image processing apparatus 1, transferring a command to scan from the PC 3 to the image processing apparatus 1, and acquiring an image by the PC 3 after the image processing apparatus 1 scans the document and generates the image, it is required that a driver as a software program for using functions of the image processing apparatus 1 is installed on the PC 3. In this embodiment, the installation unit 310 operates according to an installation control program that supports a user in installing the driver described above. The function of the installation unit 310 is described below in detail.

As described above, the installation unit 310 provides the function of installing the driver for using the image processing apparatus 1 on the PC 3. As illustrated in FIG. 5, the installation unit 310 includes an installation controller 311, a local driver controller 312, and an external driver controller 313.

To control installing of the driver, the installation controller 311 includes an execution detector 314, a storing location specification unit 315, an identification information acquisition unit 316, a program determination unit (determining unit) 317, and a processing execution controller 318. More specifically, based on an operation signal input from the operation controller 370, the installation controller 311 displays a GUI on the LCD 16 via the display controller 360 and acquires information on the image processing apparatus 1 via the network controller 350.

The installation controller 311 also acquires information on the driver installed on the PC 3 and information on peripherals such as the image processing apparatus 1 connected to the PC 3. For example, the information on the peripherals (device information) is any information specific to the peripheral such as plug and play (PnP) information etc. that can uniquely identify a vendor supplying the peripheral or a model of the peripheral. Based on the information on the peripheral acquired as described above, installation of the driver in the installation unit 310 is controlled.

The execution detector 314 acquires a name of a currently-executing process and detects that a local installer is started based on the acquired process name. The storing location specification unit 315 obtains an identifier that identifies a system definition file and specifies a location where the system definition file that includes identification information for identifying a corresponding installer is stored.

Based on a full path of the system definition file, the identification information acquisition unit 316 acquires information on a model that supports a driver included in a driver set and version information of the driver as the identification information of the driver. The program determination unit 317 acquires identification information on the driver included in the driver set stored in the local driver controller 312 and determines whether or not a latest version of the driver exists and a newer version of the driver newer than the driver included in the driver set exists. The processing execution controller 318 executes an operation corresponding to the determination result by the program determination unit.

Figure 6:
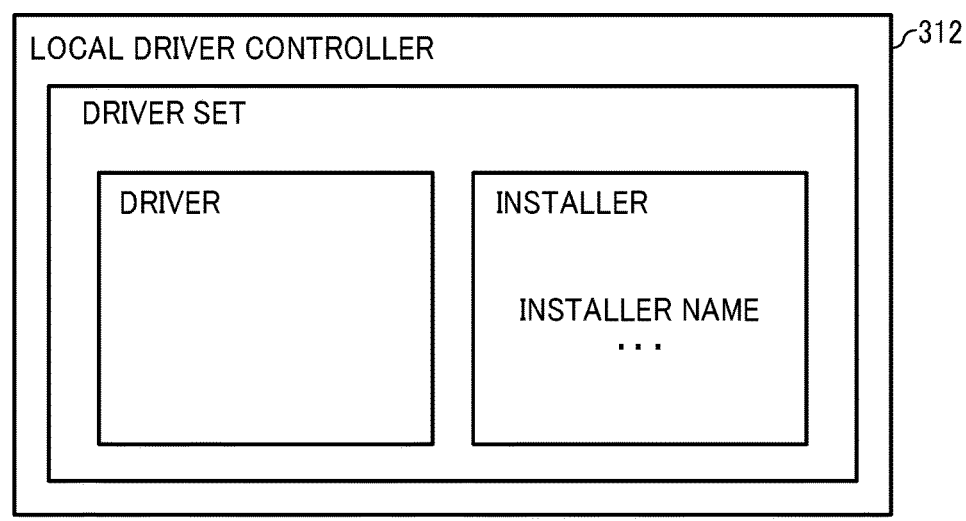
FIG. 6 is a block diagram illustrating a functional configuration of a local driver controller as an embodiment of the present invention.

The local driver controller 312 functions as an installation program that installs the driver downloaded to the PC 3. As illustrated in FIG. 6, the local driver controller 312 includes a driver set, which is a package of the driver installed on the PC 3 and the installer corresponding to that driver (hereinafter referred to as "a local installer"). The local driver controller 312 may include multiple driver sets.

The external driver controller 313 acquires a driver corresponding to the information on the peripheral connected to the PC 3 from the driver server 2 and installs the acquired driver. It should be noted that the local driver controller 312 includes the driver set that packages the driver and the corresponding local installer as described above.

Figure 7:
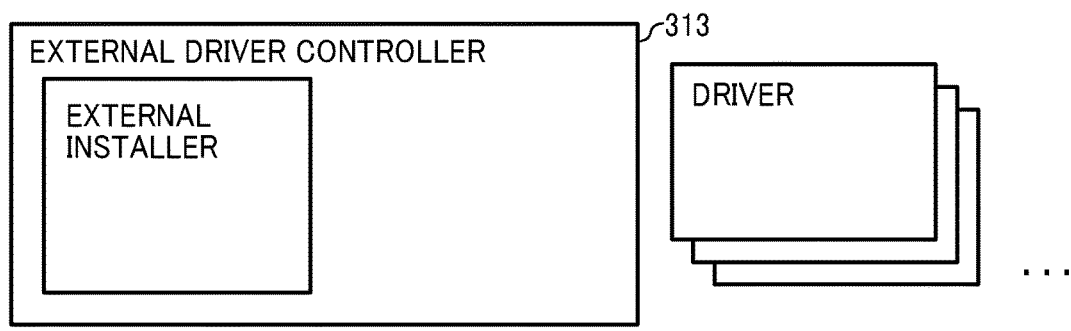
FIG. 7 is a block diagram illustrating a functional configuration of an external driver controller as an embodiment of the present invention.

On the other hand, as illustrated in FIG. 7, an installer included in the external driver controller 313 (hereinafter referred to as "an external installer") installs a driver downloaded from the driver server 2 to the HDD 14 in the PC 3 via the network. As a result, in the external driver controller 313, it is not always required that the driver is packaged with the installer, and the external installer may install the driver acquired from the driver server 2.

Figure 8:
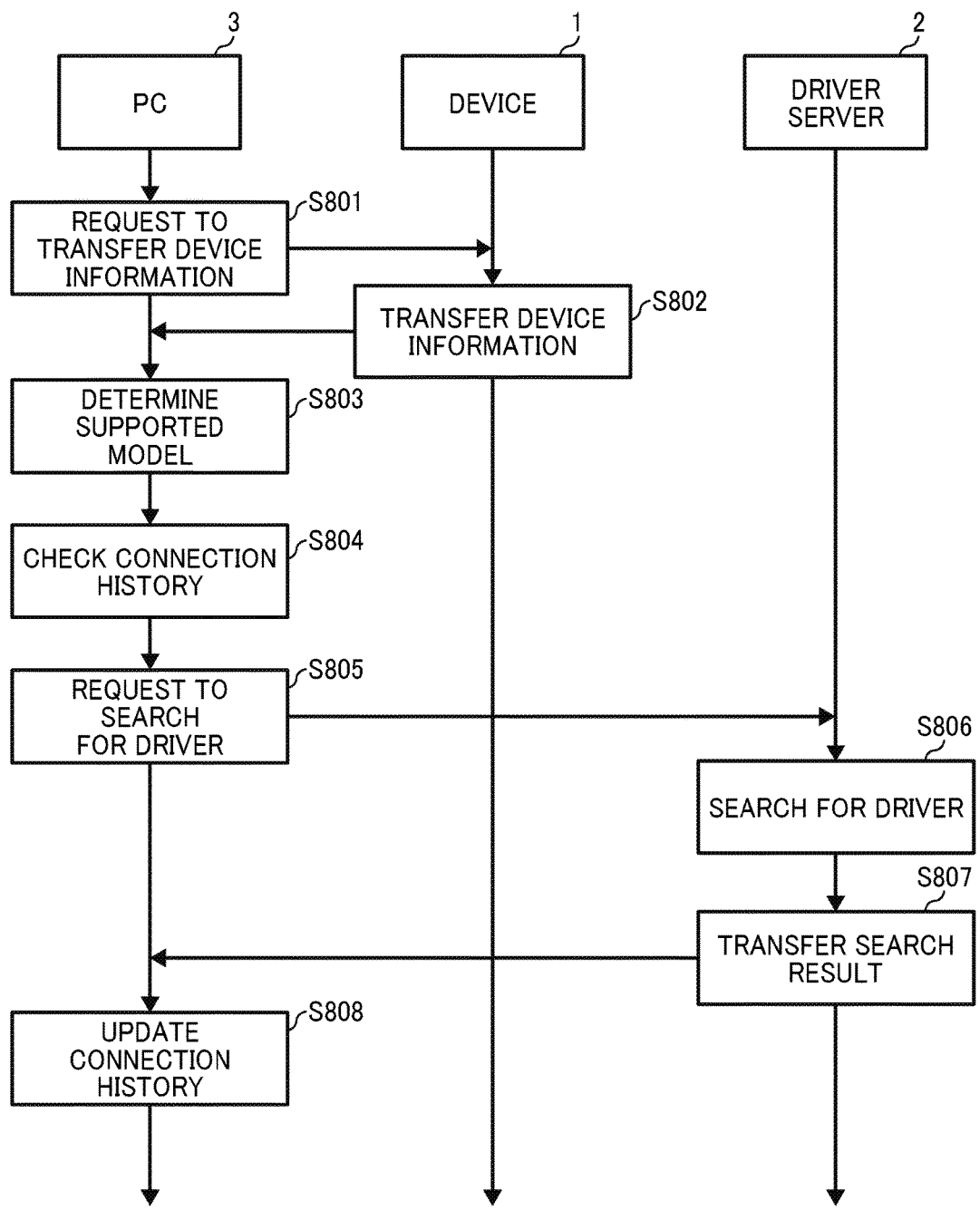
FIG. 8 is a sequence diagram illustrating an operation of checking a connection history in the image processing system as an embodiment of the present invention.

In the image processing system in this embodiment, the driver for controlling the image processing apparatus 1 is installed on the PC 3 by an operation specific to the embodiments. FIG. 8 is a sequence diagram illustrating an operation of checking a log of connections between the image processing apparatus 1 and the PC 3 in this embodiment. An operation of installing the driver for the image processing apparatus 1 to the PC 3 based on the function of the installation unit 310 specific to the embodiment is described below with reference to the figures. The operation illustrated in FIG. 8 is periodically executed when the image processing apparatus 1 is connected to the PC 3.

As illustrated in FIG. 8, the installation controller 311 requests the apparatus connected to the PC 3 (i.e., the image processing apparatuses 1a and 1b in this case) to transfer its own device information to the PC 3 in S801. If the apparatus is connected to the PC 3 via USB such as the case of the image processing apparatus 1a and the PC 3, the operation in S801 is performed after it is detected that the image processing apparatus 1a is connected to the PC 3. If the apparatus is connected to the PC 3 via the network such as the case of the image processing apparatus 1b and the PC 3, the operation in S801 is performed for all apparatuses connected to the network by the PC 3.

After receiving the request to transfer the device information, the main controller 110 acquires device information from the HDD 14 in the image processing apparatus 1 and requests the input/output controller 150 to transfer the acquired device information. As a result, the main controller 110 functions as a device information transmitter. The input/output controller 150 transfers the device information to the PC 3 via the network I/F 103 in S802.

In this case, the device information of the image processing apparatus 1 transferred to the PC 3 is the information that identifies the image processing apparatus 1 including the information on the vendor name that supplies the image processing apparatus 1 and the PnP information etc. as described above. As a result, the installation controller 311 functions as a specifying information acquisition unit that acquires the device information. After the device information is transferred to the PC 3, the device information is transferred to the installation controller 311. With reference to the transferred device information, the installation controller 311 determines whether or not a model of the source apparatus that transferred the device information is supported in S803. More specifically, if the source apparatus is its own manufacturer, the installation controller 311 determines that the source apparatus is supported.

If the image processing system in this embodiment is used in an intranet only or multiple vendors are supported in the image processing system in this embodiment, the operation in S803 may be omitted.

Figures 9, 10:
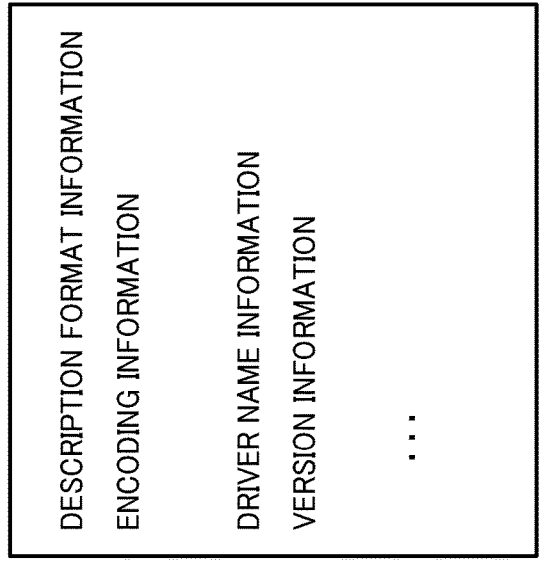
FIG. 9 is an illustration of a connection history table as an embodiment of the present invention.
FIG. 10 is a diagram illustrating a search result replied by a software distributor as an embodiment of the present invention.

After finishing the operation in S802 and S803 (or S802, in case S803 is omitted), the installation controller 311 checks whether or not a connection history with the source apparatus of the device information exists with reference to the connection history table stored in the HDD 14 in the PC 3 in S804. FIG. 9 is a diagram illustrating a configuration of information recorded in a connection history table in this embodiment. As illustrated in FIG. 9, in the connection history table, information on a connection type between the image processing apparatus 1 and the PC 3, information on PnP, information on whether or not a distribution service is supported, version information of a driver, and information on last update information etc. are stored, and the connection history table is stored in a storage medium such as the HDD 14 in the PC 3 etc.

The installation controller 311 transfers information on a request to search for a driver that should be installed in the PC 3 to the software distributor 210 in S805. More specifically, the installation controller 311 transfers the information on the request to search including a model name and OS name of the image processing apparatus 1 as key information to the software distributor 210. In this case, it is possible to transfer the information on the request to search using GET method of hyper text transfer protocol (HTTP) including the key information as described above.

After receiving the information on the request to search from the PC 3, the software distributor 210 searches for a driver corresponding to the key information in S806. If the driver corresponding to the key information supports the distribution service, the software distributor 210 transfers a search result illustrated in FIG. 10 to the PC 3 in S807.

As illustrated in FIG. 10, in the search result transferred from the software distributor 210 to the PC 3, the information on the driver name corresponding to the key information and the version information of the driver are included. As a result, the software distributor 210 functions as a version information transmitter. If the driver corresponding to the key information does not support the distribution service, the software distributor 210 does not transfer the search result to the PC 3.

In addition, as illustrated in FIG. 10, in the driver search result transferred to the PC 3 by the software distributor 210, description format information, encoding information, driver name information, and version information of the search result are included. Based on the search result received from the software distributor 210, the install controller 311 updates the connection history table in S808.

In S804, the connection history regarding the image processing apparatus 1 that has not been connected yet is generated newly based on the information on the search result transferred to the PC 3 in S807. In addition, if the search result is not transferred after a predetermined period of time elapses, the installation controller 311 updates the connection history table by setting "NO" to "whether or not distribution service is supported" column in the connection history table of the image processing apparatus 1 identified by the corresponding key information.

As described above, regarding the update of the connection history between the image processing apparatus 1 and the PC 3, in addition to a timing predetermined by user operation, it is possible to perform the operation at a timing that a new image processing apparatus 1 or a new device is connected to the PC 3.

Figure 11:
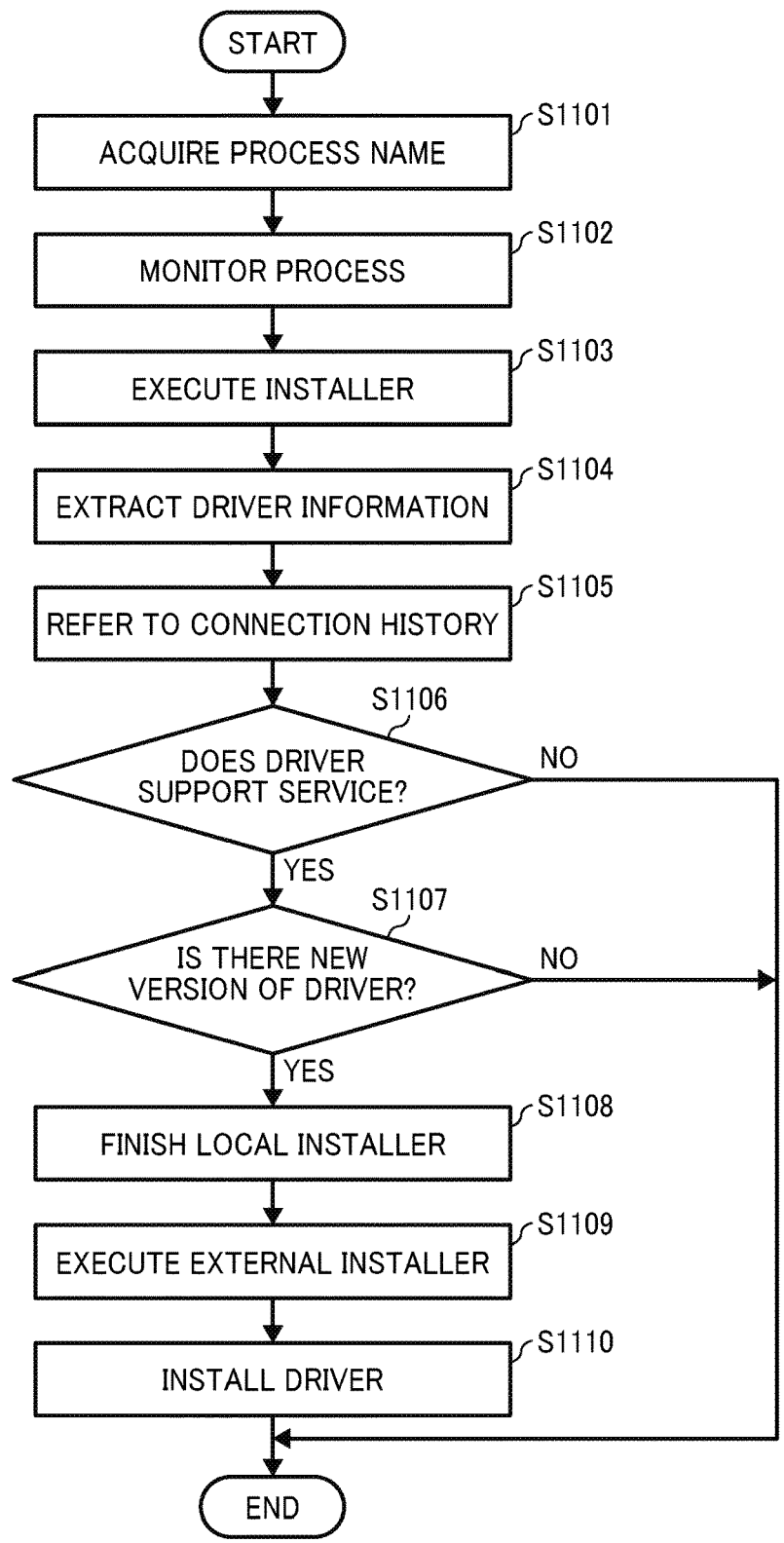
FIG. 11 is a flowchart illustrating an operation of installing a driver as an embodiment of the present invention.

Next, considering that the installation unit 310 is started as a trigger, an operation of installing a latest version of a driver that supports the image processing apparatus 1 in the PC 3 is described below with reference to FIG. 11. FIG. 11 is a flowchart illustrating an operation of installing a driver for the image processing apparatus 1 in the PC 3 in this embodiment.

First, with reference to an association installer table as illustrated in FIG. 12, the installation controller 311 acquires a process name corresponding to the installer name in S1101. The association installer table stores various information including a name of a process that can be executed by the installation controller 311 in process monitoring. More specifically, such information includes names of processes for each installer that may be used as the local installer in installing the driver for the apparatus if the apparatus is determined to be supported by the installation controller 311 in S803 in FIG. 8.

The installer table may be stored in the HDD 14 in the PC 3. Otherwise, the installer table may be stored in the driver server 2, and the installation controller 311 acquires the installer table from the driver server. In S1101, regarding the installer whose process name could not be acquired, an operation described below is not performed.

After acquiring the process name, the installation controller 311 starts monitoring the process based on the process name in S1102. Specific extraction of the process is described below in detail for an operation in a subsequent step.

Based on the operation signal input from the operation controller 370 by user operation, the local driver controller 312 starts a local installer included in the driver set in S1103. After the local installer is started by the local driver controller 312, the installation controller 311 extracts identification information of the driver to be installed by the local installer in S1104.

In S1104, the execution detector 314 acquires all process names currently running and extracts the process of the installer including the process name acquired in S1101 among the acquired process names. As a result, the installation controller 311 functions as an execution detector detecting a start of the local installer, and a subsequent operation is performed.

After the process of the local installer is extracted, the storing location specification unit 315 may acquire a path of an execution file that executes the installation. More specifically, after specifying the extracted process name, it is possible to acquire an absolute path of the extracted process by requesting the OS of the PC 3 to transfer the absolute path of the specified process name.

The storing location specification unit 315 detects an identifier that identifies the system definition file including setting information in installing the driver and specifies a location where the system definition file including the identification information for identifying the corresponding installer is stored. As a result, the installation controller 311 functions as a storing location specification unit that specifies the storing location as described above. It should be noted that either one method may be adopted among two methods described below in the operation described above.

If a folder structure of the driver set is known preliminarily, the storing location specification unit 315 preliminarily stores a conversion rule for converting the path of the installation execution file to the path of the system definition file.

For example, it is assumed that the installation execution file is stored in a same folder as the system definition file, and only their extensions of the file names are different. In such case, the storing location specification unit 315 deletes the extension indicating that the file is the execution file, from the path of the acquired installation execution file, and add the identifier indicating that the file is the system definition file.

In another example, it is known preliminarily that the installation execution file is stored in the same folder as the system definition file and the file name of the installation execution file is different from the file name of the system definition file. In this case, as illustrated in FIG. 13, the storing location specification unit 315 deletes the file name of the installation execution file from the path of the acquired installation execution file and adds the file name of the system definition file.

More specifically, for example, it is assumed that the path of the acquired installation execution file is "¥User¥Download¥driver¥installer.exe" and the file name of the system definition file is "oemsetup.inf". In this case, the storing location specification unit 315 specifies the path of the system definition file as "¥User¥Download¥driver¥oemsetup.inf". As a result, it is possible to identify the file path to the system definition file that includes setting information in installing a driver.

If the structure of the folder storing the driver set is unknown, the storing location specification unit 315 recursively extracts a file that uses the identifier indicating that the file is system definition file as its extension from the package of the acquired installation execution file. More specifically, as illustrated in FIG. 14, the storing location specification unit 315 selects files using the extension indicating that the file is the system definition file, and acquires a full path of the system definition file among the selected files.

As described above, based on the acquired full path of the system definition file, the identification information acquisition unit 316 specifies the system definition file and acquires information of a model supported by the driver included in the driver set and version information of the driver from the specified system definition file. The information on the model supported by the driver and the version information of the driver is the identification information of the driver. As a result, the installation controller 311 functions as the identification information acquisition unit that acquires the identification information of the driver.

As described above, the installation controller 311 acquires the identification information of the driver included in the driver set stored in the local driver controller 312. Next, the program determination unit (determining unit) 317 refers to the connection history table stored in the HDD 14 in S1105.

After referring to the connection history table, if the driver specified in S1104 supports the distribution service of the software distributor 210 (YES in S1106), the program determination unit 317 refers to the connection history table and compares the version information of the driver specified in S1104 in the connection history table with the version information of the driver extracted in S1104 in S1107.

In the comparison in S1107, it is determined whether or not the latest version of the driver installed by the local installer exists or the newer version of the driver installed by the local installer exists. As a result, the installation controller 311 functions as the program determination unit that determines whether or not a new control program as the latest version of the driver exists and a latest control program as a newer version of the driver compared to the version of the corresponding driver exists.

If the latest version of the driver or the newer version of the driver compared to the driver installed by the local installer exists, (YES in S1107), the processing execution controller 318 acquires the latest version of the driver or the newer version of the driver compared to the driver installed by the local installer. Subsequently, the processing execution controller 318 transfers the driver acquired from the software distributor 210 to the external driver controller 313.

In addition, if the latest version of the driver or the newer version of the driver compared to the driver installed by the local installer exists, the processing execution controller 318 requests the local driver controller 312 to quit the installer in S1108. As a result, the installation controller 311 functions as the processing execution controller that performs an operation in accordance with the determination result by the program determination unit 317 that determines whether or not the latest version of the driver or the newer version of the driver compared to the driver installed by the local installer exists.

After receiving the driver transferred by the processing execution controller 318, the external driver controller 313 commands to start the external installer in S1109 to control the external installer to install the received driver in S1110. As described above, in the image forming system in this embodiment, it is possible to install the latest version of the driver or the newer version of the driver compared to the driver installed by the local installer.

In case of NO in steps S1106 and S1107, i.e., if the driver specified in S1104 does not support the distribution server or the driver is the latest version, the installation controller 311 finishes the operation in FIG. 11 instead of requesting the external driver controller 313 to perform the operation.

Subsequently, based on the full path of the system definition file acquired in S1104, the installation controller 311 requests to install the driver included in the driver set stored in the local driver controller 312. This results in installation of the driver in the PC 3 in accordance with user intension.

Figure 15:
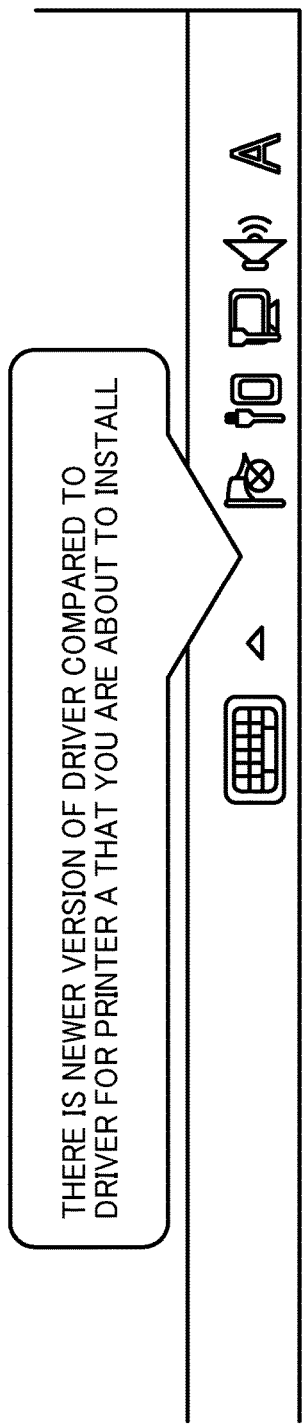
FIG. 15 is a diagram illustrating a message displayed on the PC as an embodiment of the present invention.
Figure 16:
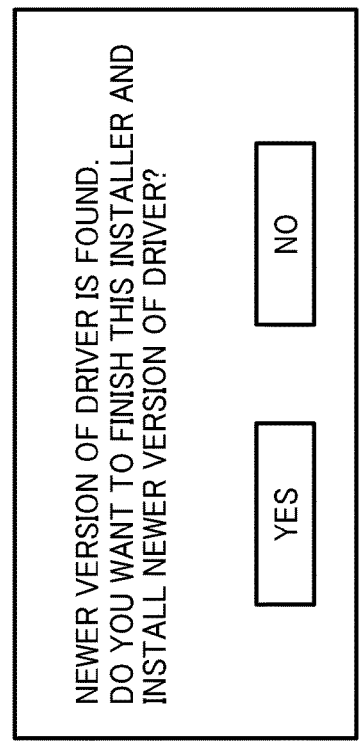
FIG. 16 is a diagram illustrating a GUI displayed on the PC as an embodiment of the present invention.

It should be noted that the installation controller 311 may display a UI illustrated in FIGS. 15 and 16 on the screen of the PC 3. The UI illustrated in FIG. 15 is a pop-up message so that the user may recognize that the latest version of the driver exists. If the latest version of the driver is stored in the driver server 2, the pop-up message illustrated in FIG. 15 is displayed on the screen of the PC 3 by the installation controller 311 instead of performing the operation in steps S1108 to S1110. As a result, the installation controller 311 functions as a notification unit that notifies that the latest version of the driver exists in the PC 3.

Before S1108, by performing an operation on a GUI such as a dialog illustrated in FIG. 16 by user operation, it is possible to determine whether or not the latest version of the driver is installed in the PC 3. For example, if "YES" button illustrated in FIG. 16 is clicked by user operation, the installation controller 311 downloads the latest version of the driver from the driver server 2 and commands the external driver controller 313 to install the latest version of the driver.

That is, if "YES" button is clicked, the installation controller 311 finishes the local installer by "WM_CLOSE" command or "taskkill" command and starts the external installer.

As described above, in the image processing system in this embodiment, by treating starting of the installer of the driver downloaded in the PC as a trigger, the latest version of the driver is installed. As a result, it is unnecessary to search for the latest version of the driver on the network and to start the installer program for installing the latest version of the driver. Since the driver for controlling the image processing apparatus can be easily installed onto the PC, the user can operate the image processing apparatus using the latest version of the driver without complicated operations.

This further reduces a burden on the administrator as well as freeing the user from transferring information to the other apparatus.

In the embodiment described above, the printer driver for controlling the image processing apparatus is described as an example. However, a similar operation may be adopted to control program for controlling hardware installed in the information processing apparatus such as device drivers for devices installed in the information processing apparatus such as an extension card, e.g., a network interface card (NIC) etc. and device drivers for external peripherals such as input/output devices, e.g., a graphic display and a sound speaker etc.

The present invention also encompasses a non-transitory recording medium storing a program that executes a control program management method, performed by an information processing apparatus. The control program management method, performed by the information processing apparatus, includes the steps of detecting execution of an installation program that installs a control program onto the information processing apparatus, the control program controlling hardware connected to the information processing apparatus, specifying a location where identification information identifying the control program is stored in response to detection of the execution, acquiring the identification information from the specified location, determining whether or not a newer version of the control program exists compared to a version of the control program identified with the acquired identification information, and performing an operation in accordance with a determination result indicating whether or not the newer version of the control program exists.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these. Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus, comprising circuitry to:
   detect, with the circuitry, execution of an installation program that installs a control program onto the information processing apparatus, the control program controlling hardware connected to the information processing apparatus;
   in response to detection of the execution of the installation program, acquire a process name of the installation program, acquire a path of an execution file that executes the installation program based on the process name, detect a system definition file based on the path, and acquire identification information identifying the control program from the system definition file;
   prior to completion of the execution of the installation program, determine whether or not a newer version of the control program exists compared to a version of the control program identified with the acquired identification information; and if the newer version of the control program exists, stop the execution of the installation program and execute other installation program different from the installation program that has stopped executing.

2. The information processing apparatus according to claim 1,
wherein, if the newer version of the control program exists, the circuitry controls a display of the information processing apparatus to display information indicating that the newer version of the control program exists.

3. The information processing apparatus according to claim 1,
wherein, if the newer version of the control program exists, the circuitry controls a display of the information processing apparatus to display a GUI indicating that the newer version of the control program exists, and
in response to receiving a request for installing the newer version of the control program in the information processing apparatus through the GUI, the circuitry further ends execution of the installation program and executes the other installation program different from the installation program.

4. The information processing apparatus according to claim 3,
wherein the other installation program acquires the control program to be installed onto the information processing apparatus via a network.

5. A control program management system comprising:
hardware, the hardware at least including a device information transmitter to transfer device information specific to the hardware;
an information processing apparatus to install a control program for controlling the hardware communicably connected to the information processing apparatus; and
a server to store the control program in a program memory,
wherein the information processing apparatus includes circuitry to: detect execution of an installation program that installs a control program onto the information processing apparatus, the control program controlling hardware connected to the information processing apparatus;
in response to detection of the execution of the installation program, acquire a process name of the installation program, acquire a path of an execution file that executes the installation program based on the process name, detect a system definition file based on the path, and acquire from the server identification information identifying the control program based on the system definition file;

prior to completion of the execution of the installation program, determine whether or not a newer version of the control program exists compared to a version of the control program identified with the acquired identification information; and if the newer version of the control program exists based on the identification information acquired from the server, the circuitry of the information processing apparatus stops the execution of the installation program and executes other installation program different from the installation program.

6. A method of managing a control program performed by an information processing apparatus, the method comprising:
detecting, with an installation controller, execution of an installation program that installs a control program onto the information processing apparatus, the control program controlling hardware connected to the information processing apparatus;

in response to detecting the execution of the installation program, acquiring, with the installation controller, a process name of the installation program, acquiring a path of an execution file that executes the installation program based on the process name, detecting a system definition file based on the path, and acquiring identification information identifying the control program from the system definition file;

prior to completion of the execution of the installation program, determining, with the installation controller, whether or not a newer version of the control program exists compared to a version of the control program identified with the acquired identification information; and if the newer version of the control program exists, stopping, with the installation controller, the execution of the installation program and execute other installation program different from the installation program that has stopped executing.

* * * * *